US00RE38062E

(19) United States
(12) Reissued Patent
Fulinara et al.

(10) Patent Number: US RE38,062 E
(45) Date of Reissued Patent: Apr. 8, 2003

(54) MICROWAVE AND MILLIMETER WAVE STRIPLINE FILTER AND PROCESS FOR FABRICATING SAME

(75) Inventors: Napoleon A. Fulinara, San Diego, CA (US); Deborah S. Patterson, Phoenix, AZ (US)

(73) Assignee: StratEdge Corporation, San Diego, CA (US)

( * ) Notice: This patent issued on a continued prosecution application filed under 37 CFR 1.53(d), and is subject to the twenty year patent term provisions of 35 U.S.C. 154(a)(2).

(21) Appl. No.: 08/601,452

(22) Filed: Feb. 14, 1996

Related U.S. Patent Documents

Reissue of:
(64) Patent No.: 5,285,570
Issued: Feb. 15, 1994
Appl. No.: 08/054,743
Filed: Apr. 28, 1993

(51) Int. Cl.[7] ..... A05K 3/36

(52) U.S. Cl. ..... 29/830; 156/89.11; 156/89.12; 333/204; 333/238

(58) Field of Search ..... 29/825, 600, 830; 156/89, 89.11, 89.12; 264/61; 333/247, 204, 238

(56) References Cited

U.S. PATENT DOCUMENTS 4,609,892 A * 9/1986 Higgins, Jr. ..... 333/204
4,646,128 A 2/1987 Carson et al.
4,699,871 A 10/1987 Holz ..... 430/314
4,706,166 A 11/1987 Go
4,743,868 A * 5/1988 Katoh et al. ..... 333/204 X
4,764,846 A 8/1988 Go
4,901,041 A 2/1990 Pengelly ..... 333/33
4,912,545 A 3/1990 Go
4,994,215 A * 2/1991 Wiech, Jr.
5,032,803 A * 7/1991 Koch ..... 29/830 X
5,133,129 A * 7/1992 Thomson, Jr. ..... 29/600
5,219,377 A * 6/1993 Poradish ..... 29/840 X

FOREIGN PATENT DOCUMENTS

JP 4-246901 * 9/1992 ..... 333/204

OTHER PUBLICATIONS

*Next–Generation High–Speed Packaging*, by Holz, Gary *MSN & Communications Technology*, Jan. 1988, pp. 32, 34, 38 and 40.

*High–Performance Packaging for Monolithic Microwave and Millimeter–Wave Integrated Circuits*, by K.A. Shalkhauser, K. Li and Y.C. Shih, *14th AIAA International Communication Satellite Systems Conference & Exhibit*, Mar. 22–26, 1992, Washington DC, pp. 1–9.

(List continued on next page.)

*Primary Examiner*—Carl J. Arbes
(74) *Attorney, Agent, or Firm*—Eleanor M. Musick; Kilpatrick Stockton LLP

(57) ABSTRACT

Pre-fired ceramic substrates are elected according to the desired electrical performance of the filter. If necessary for enhanced performance, the surfaces of the substrate may be lapped to assure that their top and bottom surfaces are parallel and their surface finish is smooth. The top surface of a lower layer is coated with a conductive film using thick film techniques then patterned to define the filter trace pattern. For precise dimensional control, photolithographic techniques may be used. The bottom and the sides of the lower layer are coated with the same conductive film. A seal glass which has a coefficient of thermal expansion which is matched as closely as possible to that of the ceramic substrate is screen printed onto the top surface of the lower layer. The top of the upper layer is screen printed with the conductive film and the bottom of the upper layer is coated with the seal glass. The upper and lower layers are bonded together by clamping them together and firing the seal glass. The sides of the assembly are then coated with a conductive film to provide groundplane connection.

28 Claims, 3 Drawing Sheets

OTHER PUBLICATIONS

*Packaging: Making It Fit A Changing Market*, by Ron Schneiderman, *Microwaves & RF*, Feb., 1992, pp. 33, 34, 36 and 40–42.

*Packaging and System Integration of Microwave and Digital Monolithic IC'S*, by Gary Holz, John L. Bugeau and Martin A. Priolo, *IEEE MTT–S Digest* HH–1, 1991, pp. 1059–1062.

*A High–Performance Quartz Package for Millimeter–Wave Applications*, by Y.C. Shih, *IEEE MTT–S Digest*, HH–2, 1991, pp. 1063–1066.

*MMIC Packaging with Waffleline** by R.W. Perry, TT. Ellis and E.R. Schineller, *Microwave Journal*, Jun. 1990, pp. 175, 176,178, 180 and 181.

*Design Consideration for Microwave Packages* by Charles Williams, *Ceramic Bulletin*, vol. 70, No. 4, 1991, pp. 714–721.

*Low–Cost Package Technology for Advanced MMIC Applications*, by S. Chai, R. Kirschmann, S. Ludvik, et al., *IEEE MTT–S Digest*, Q–3, 1990, pp. 625, 627 and 628.

*Ceramic and Glass–Ceramic Packaging in the 1990S* by Rao R. Tummala, *Journal of the American Ceramic Society–Tummala*, vol. 74, No. 5, May, 1991, pp. 895–908.

"High–Performance 20–GHz Package for GaAs MMICs", *MSN & Communications Technology, Micro–Wave Systems News*, Jan., 1988, pp. 10–17.*

* cited by examiner

MICROWAVE AND MILLIMETER WAVE STRIPLINE FILTER AND PROCESS FOR FABRICATING SAME

Matter enclosed in heavy brackets [ ] appears in the original patent but forms no part of this reissue specification; matter printed in italics indicates the additions made by reissue.

BACKGROUND OF THE INVENTION

The most commonly practiced technology for fabricating multi-layer substrates uses co-fired tape cast ceramics. The co-fired ceramic structure is a monolithic ceramic substrate after it has been completely fired. However, the manufacture of multi-layer substrates using cast ceramic, or "green tape", introduces its own problems. This technology possesses a number of disadvantages due to potential variation in the alignment of conductive patterns, vias and cavities which limit interconnect density. These problems are created by the differential shrinkage within and between the individual layers of the ceramic material from which the multi-layer substrate is formed. Also, the surface roughness of the tape cast ceramics limit electrical performance. Further, since tape cast or green sheet ceramics can contain between 8% and 40% binders, the purity levels of the processed ceramics are not tightly controlled, leading to a compromise in electrical performance. At higher frequency applications, electrical response can become quite sensitive to material variations, resulting in the limitation of the electrical performance of co-fired ceramics to lower frequencies within the millimeter wave and microwave ranges.

A process has been developed for fabricating millimeter wave and microwave packages and interconnect structures in which a multi-layer structure of fully-fired (or hardened) ceramics with conductive patterns is formed by attaching separate substrate layers together with seal glass which has a coefficient of thermal expansion (CTE) which is matched as closely as possible to the CTE of the substrates. The pre-fired ceramics are fully hardened prior to processing so that no shrinkage occurs as binders are burned off, as would occur in green sheet processing. In contrast, as green tape ceramics are fired (hardened), shrinkage occurs as the material is sintered and as binders are burned off. This is an undesirable phenomenon with respect to routing RF circuitry since the metallization pattern will also shrink and shift, affecting the electrical response of the circuit. With the fully-fired ceramics, no compensation is required to allow for shrinkage of conductive features, so that tighter control of dimensions is available, and higher density features can be incorporated. The fully-fired ceramic material, including, but not limited to, alumina, aluminum nitride, berrylia, and quartz, is selected to conform with the intended operation parameters of the package or component to be fabricated.

Special considerations arise when fabricating filters for microwave and millimeter wave applications for satellite and mobile communication systems. While small size and mass are desirable, stability of electrical response is a significant concern for narrowband or highly specialized performance requirements. Stability of the center frequency of a bandpass filter can vary with temperature. Such drift can be particularly detrimental for switch filter networks which are used in systems that provide a high degree of channel flexibility in order to precisely divide the spectrum. In conventional approaches, the frequency drift problem due to temperature fluctuation is overcome by using Invar® (InFe) waveguides, which are expensive. Although the use of waveguides is unavoidable in high power satellite applications, the proposed filter can be useful in low power applications such as receiver front ends. Furthermore, in the lower microwave region, filters use lumped elements which are also expensive and not suitable for low cost mass production. Lumped element filters are very lossy when compared to distributed resonator filters.

In conventional fabrication technology, filters are manufactured using high dielectric constant ceramic-based coaxial resonators. The designs are based on empirical techniques and each filter is individually fabricated and must be tuned after production. The advantages of using a stripline approach are as follows:

1) Fully-fired ceramic technology applied to a stripline approach yields filters which should not require any post-production tuning;
2) Because a stripline is a printed transmission line, a large number of filters can be simultaneously printed on a single ceramic board. Consequently, a great reduction in production cost could be achieved;
3) Fully-fired ceramic technology applied to stripline processing and grounding techniques will give rise to a completely shielded and robust ceramic block filter capable of withstanding high levels of vibration and g-forces.

SUMMARY OF THE INVENTION

It is an advantage of the invention to provide a process for fabricating a stripline filter for microwave and millimeter wave applications which utilizes hardened, high dielectric constant ceramic substrates combined with stripline technology to create a small, lightweight package.

It is another advantage of the present invention to provide a process for mass producing a stripline filter with tight tolerances and repeatable performance.

It is a further advantage of the present invention to provide a process for fabricating a stripline filter which eliminates the need for compensation for dimensional instability of the ceramic substrate.

In an exemplary embodiment, the process for fabricating a stripline filter uses two pre-fired ceramic substrates. The substrates may be lapped for flatness and parallelism between the top and the bottom, and to modify the surface texture to provide better electrical performance at high frequency where such performance is required. A conductive paste is applied to the top of each substrate using thick film techniques as are known in the industry. Multiple screening steps are required to obtain the desired conductor thickness. On the top of the lower layer, the conductive paste is patterned with the filter structure using photolithographic and chemical etch techniques which are known in thick and thin film processing. The conductive paste is also screen printed onto the bottom side of the lower layer and the sides of the lower layer are painted with the same conductive paste. A seal glass is screen printed on top of the patterned conductor and is dried and glazed to burn off organic binder and to cause the material to bond together. On the upper layer, the conductive paste is unpatterned. Seal glass is printed onto the bottom of the upper layer, dried and glazed. The upper and lower layers are clamped together after aligning their edges and are fired to seal the two layers together. Groundplane connection between the upper and lower layers is provided by painting the sides of the assembly with conductive paste. The entire assembly is again fired to burn off the binder and to harden the conductor. If desired, the lower layer substrate can be laser machined to provide launch areas for wire bond attachment. This machining will be done before lapping.

BRIEF DESCRIPTION OF THE DRAWINGS

The present invention will be better understood from the following detailed description of a preferred embodiment, taken in conjunction with the accompanying drawings, in which like reference numerals refer to like parts, and in which.

DESCRIPTION OF THE PREFERRED EMBODIMENT(S)

Figure 1A:
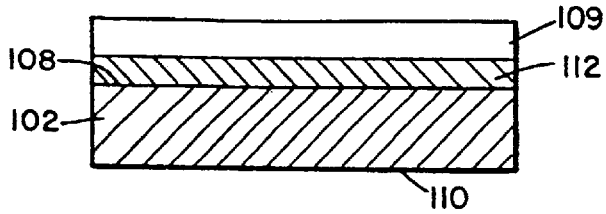
FIGS. 1a–1j is a flow diagram illustrating the sequence of steps in a process for fabricating a millimeter wave or microwave stripline filter.

The following description is for an "L"-band bandpass filter. Various process parameters may change for other types of filters, but the general process may be applied to a wide variety of stripline filters.

As illustrated in FIGS. 1a–1j, the process comprises selection of the substrate 2 which is pre-fired, and thus is already hardened. The substrate is high purity alumina ($Al_2O_3$) (99.6%), which is selected for its high dielectric constant and for its capability of attaining a smooth, uniform surface finish. Other ceramics which may be used are fused silica ($SiO_2$), 96% aluminum oxide, aluminum nitride (AIN) or titanate.

Hardened, fully fired (pre-fired) ceramics are commercially available from ceramic vendors. Since the ceramics are already fired, the purity of the ceramic can be specified, allowing tighter control over electrical performance. The pre-fired ceramic substrate is typically purchased in one inch to 4.5 inch square blanks, with the size selected according to the product to be fabricated. For fabrication of filters shown in FIGS. 2 and 3, 2"×2" blanks are used with a thickness of 0.050". Length and width of the blank can be adjusted to allow variance of the trace pattern to obtain the desired performance. If launch areas 18 (shown on FIG. 2) are to be provided for wire bonding, the substrate 102 is machined to cut away parts of the blank, leaving extensions onto which a conductor will be patterned. This machining is generally performed by laser ablation using a $CO_2$ laser, which is the industry standard machining technique. Other machining techniques which may be used are ultrasonic machining or wire cutting, and other types of lasers may be used. Laser slag that may build up around the machined areas is removed by mechanically scrubbing the substrate.

Both the top layer substrate 2 and the bottom layer substrate 102 are lapped and polished to modify flatness, parallelism between the respective top surfaces 8 and 108 and the bottom surfaces 10 and 110, and surface texture. Parallelism is important for filters—the distance between conductors on the top and bottom surfaces must remain constant across the entire substrate. Surface finish can also effect electrical performance, particularly at high frequencies. Generally, the surface finish from an alumina (99.6%) substrate is on the order of 1 to 5 microinch after lapping and polishing, as compared to the finish of incoming pre-fired alumina of 15 to 20 microinch.

The substrates 2 and 102 are cleaned ultrasonically using a detergent suitable for electronic applications, such as Alconox®, which is a degreaser/detergent containing sodium silicate and sodium hydroxide. The detergent may be heated for the cleaning process (this detergent is not suitable for use on aluminum nitrate substrates, and another detergent should be selected.) The substrates 2 and 102 are then rinsed with deionized water and fired to burn out any residues from the detergent.

Figure 5:
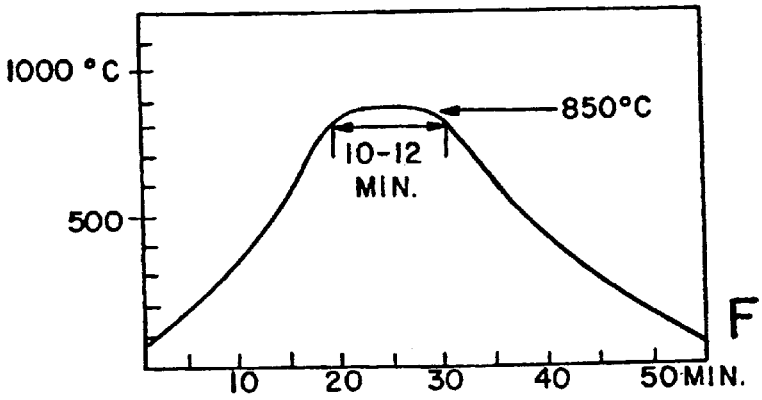
FIG. 5 is a manufacturer's plot of firing profile for gold paste used in the preferred embodiment.

A conductive film 112 is formed on the top surface 108 of the lower layer 102 using a conductive paste and thick film screen printing techniques as are known in the art. Depending on the filter's application, and the type of conductor used, it may be necessary to repeat the printing sequence at least once to attain a predetermined thickness, with each printing step being following by a drying and firing step. The conductive film 112 must be uniform and within a close tolerance of the target thickness in order to provide the best filter performance. The gold paste used in the preferred embodiment, JMI 1206, produced by Johnson-Matthey, Inc., is printed, dried and fired five times to attain a final thickness of about 0.8 mil. For JMI 1206, the firing conditions are selected according to the plot provided in FIG. 5. As is known in the industry, the firing temperature, time and conditions depend on the type of conductive material used. The appropriate parameters are provided by the supplier of the conductive paste.

Many different conductive pastes can be used and the selection of such a paste will depend upon the product being fabricated. Several different combinations of gold and glass are available, with variations in the mixtures providing varied levels hermeticity, wiring bondability, solderability, etchability, adhesion and processing temperatures. Other possible conductive pastes include, but are not limited to, platinum-gold, gold-silver, gold-germanium, gold-tin, copper and silver. Selection of the appropriate paste for the desired product properties falls within level of skill in the art.

Figure 1B:
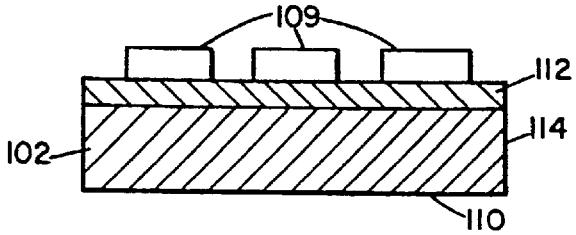
Figure 3:
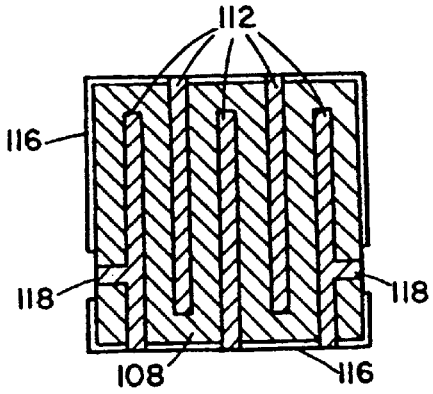
FIG. 3 is a diagrammatic view one a first possible filter configuration.

After the conductive film 112 is in place on lower layer 102, a photolithographic process is used to define the interdigitated structure of the filter. A possible filter configuration is shown in FIG. 3. The configuration is selected according to desired coupling values and operating mode using similar criteria to those used for other types of stripline or microstrip filters. Such criteria are known to those skilled in filter technology. This step follows the process which is known in thin film technology in which a photoresist (PR) layer is spun onto the surface of the conductive film 112 (FIG. 1a), the PR 109 is exposed to ultraviolet light modulated by a mask bearing the desired pattern, and the exposed PR is rinsed away using a developer, allowing the areas to be etched unprotected, as shown in FIG. 1b. In the preferred embodiment, positive PR is used and the mask is a contact mask made of mylar. The etch solution which is used for gold conductors is a mixture of potassium iodide and iodine. After etch, the PR is stripped and a clean fire step is performed to burn away any chemical or organic residues.

Precise linewith control may not always be required in lower performance applications. For economic reasons, the photolithographic steps may then be omitted, so that the patterning of the conductor is provided entirely by screen printing techniques.

Figure 1C:
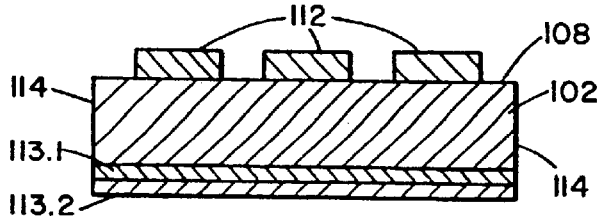
Figure 1D:
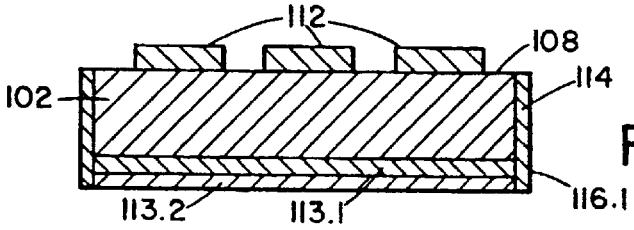
Figure 1E:
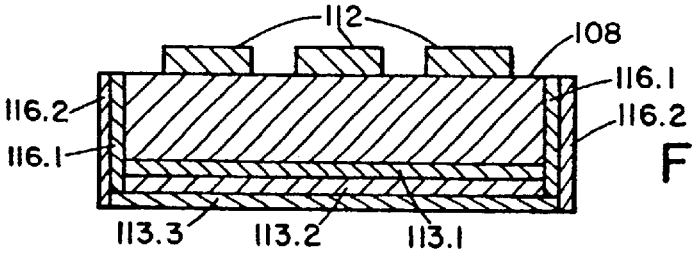
Figure 2:
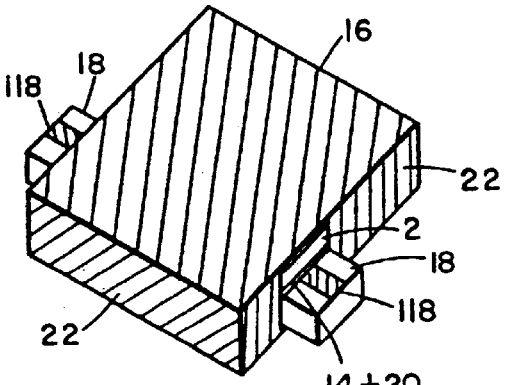
FIG. 2 is a perspective view of an assembled microwave filter with optional launch areas.

Conductive paste is screen printed onto the bottom of lower layer 102, using the same material as was used for the trace pattern, to form conductive film 113. One sequence of print/dry/fire is performed to create film 113.1 after which a second coating of conductive paste 113.2, illustrated in FIG. 1c, is screen printed onto the bottom and dried. Without firing the conductive paste, the sides 114 are then coated with a conductive film 116.1 using the same conductive paste by painting the paste onto the sides, shown in FIG. 1d, and drying it. As can be seen in FIG. 2, the areas immediately surrounding the input/output ports 118 are left uncovered. Another layer 113.3 of conductive paste is printed onto the bottom and dried, and the sides are again painted with the conductive paste 116.2, shown in FIG. 1e. The last application of conductive paste dried and the assembly is fired to form films 113 and 116. The final thickness of the conductor on the bottom is about 0.5 mil.

Figure 1F:
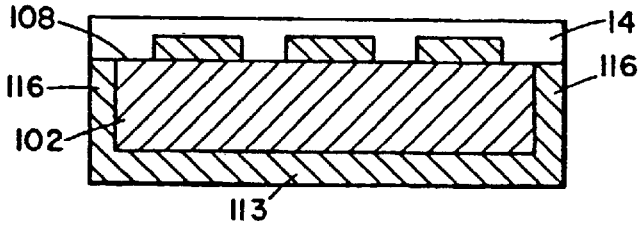

Seal glass 14 is screen printed onto the top surface 108 and the now-patterned conductive film 112, illustrated in FIG. 1f. Multiple printings of seal glass are performed in order to obtain the desired final thickness of 0.0045". The sequence followed is print/dry/print/dry/glaze. A solid layer of seal glass is then formed over the entire top surface 108.

It should be noted that conductor and seal glass thicknesses are dependent upon the frequency of operation for which the filter is being fabricated. Thus, the thicknesses will vary.

The glazing temperature is selected to be high enough that volatile materials (organics) within the glass are burned off, but not so high that the conductor will melt or flow. The temperature depends on the type of material used and the appropriate temperature ranges are provided by the glass manufacturer.

Figure 4A:
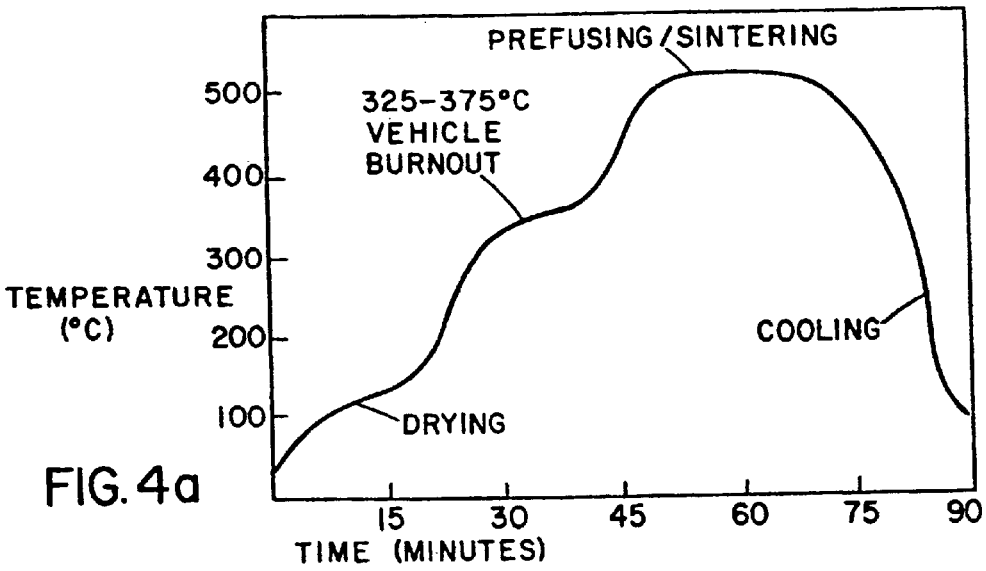
FIGS. 4a and 4b are manufacturer's plots of temperature profile for seal glass.
Figure 4B:
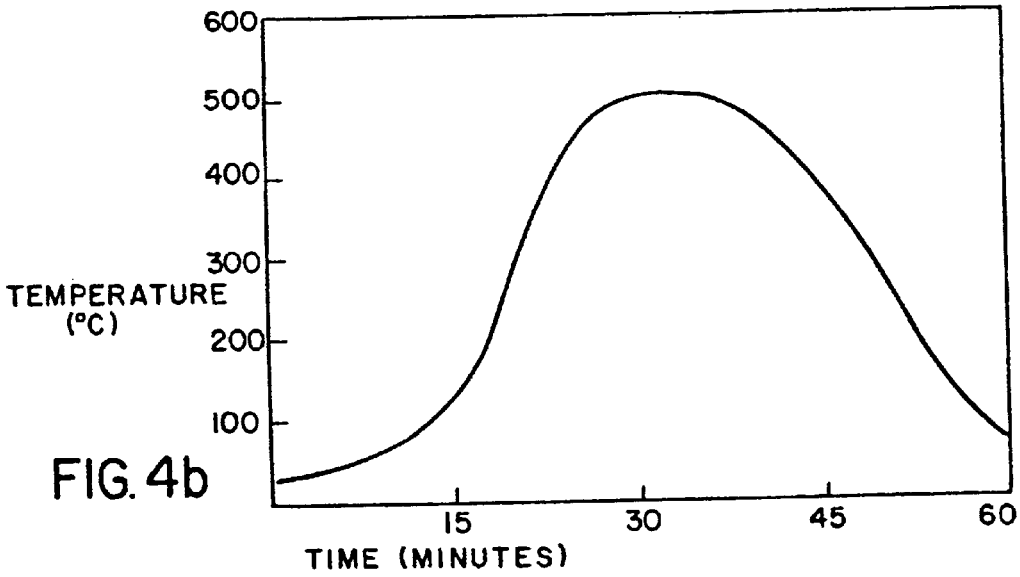

The selection of the seal glass is dominated by the substrate on which the filter is to be fabricated. An important feature of the pre-fired ceramic process is that the seal glass is selected to have a coefficient of thermal expansion (CTE) and dielectric constant which match as closing as possible the CTE and dielectric constant of the ceramic of which the substrates 2 and 102 are formed. The matching of the CTEs alleviates thermal stress between adjacent layers of a multilayer structure. For 99.6% alumina, the CTE is $8.0\times10^{-6}$. In the preferred embodiment, the seal glass is designated 4032-C, manufactured by Electro Science Lab (ESL). The conditions recommended by the manufacturer for glazing are provided in the temperature profiles illustrated in FIGS. 4a and 4b. FIG. 4a illustrates the recommended processing conditions for drying, burnout and prefusing/sintering. FIG. 4b illustrates the recommended conditions for sealing, after drying, burnout and pre-fusing/sintering.

Figure 1G:
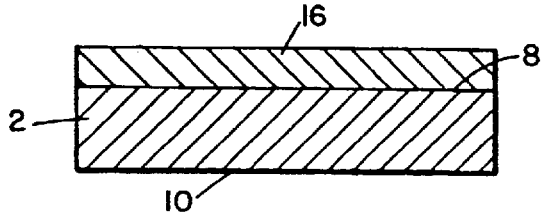

On the upper layer 2, a conductive film 16 is formed using conductive paste which is screen printed onto the top surface 8, shown in FIG. 1g. The conductive paste is the same material as used for the lower layer. This conductive film 16 is unpatterned, creating a solid ground plane. Multiple printing steps are required to obtain the desired thickness, with dry and fire steps following each printing. In the preferred embodiment, three sequences are performed.

Figure 1H:
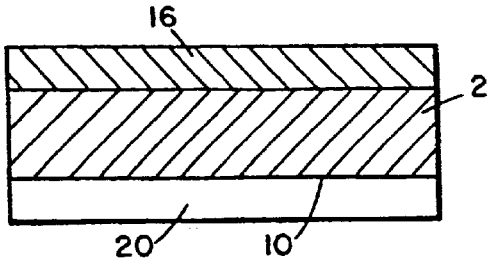

A seal glass 20 is screen printed onto the bottom surface 10 of the upper layer, as in FIG. 1h. The same seal glass is used as was printed onto the top of the lower layer. Multiple printings are performed to provide sufficient thickness, with each printing step being followed by a dry step and a glaze step. In the preferred embodiment, one print/dry/glaze sequence is performed.

Figure 1I:
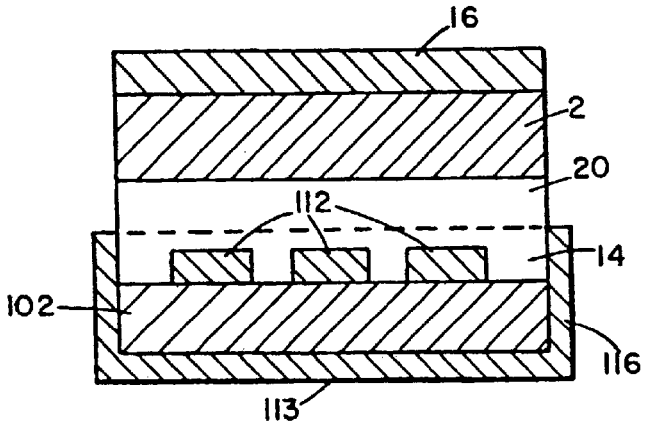
Figure 1J:
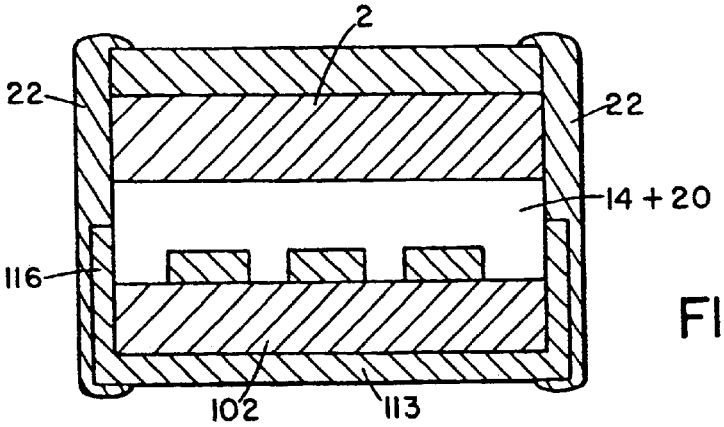

For final assembly, the upper layer 2 is placed on top of the lower layer 102 and their sides are aligned, shown in FIG. 1i (note that the edge conductor 116 is shown exaggerated in relative thickness). The two layers are clamped together using high temperature clamps and the assembly is fired to bond the layers together, forming a continuous seal glass 14+20.

The sides of the assembly are painted with a conductive paste to form conductive film 22 which wraps around the edges (FIG. 1j), with care being exercised to eliminate voids. The areas of the sides surrounding the input/output ports 118 are left uncovered, as seen in FIG. 2. The material used for this step is different than that used for all prior steps. The gold paste used in the preferred embodiment is designated as 8835 (520), manufactured by ESL. This material is selected because its binder can be burned off at a lower temperature to avoid exposure of the assembly to further processing at higher temperatures. The manufacturer's recommended firing conditions are 15 minutes at peak temperature (500° C.).

The inventive process is made possible by the use of the hardened, fully-fired starting ceramic substrate and the matching of the coefficient of thermal expansion (CTE) between the substrate and seal glass. The elimination of compensation requirements and other variables encountered in co-fired ceramic technology and the precise dimensional control provided by the use of thick or thin film patterning techniques, permits the fabrication of stripline filters with excellent operational stability. The inventive process allows these filters to be mass produced without requiring individual treatment to adjust for the appropriate frequency. Different filter configurations and dimensions can be easily implemented by changing the photolithographic mask, allowing, for example, better narrowband capability so that more channels can be isolated within a given band of frequencies, by utilizing different substrates, and by changing the selections of and thicknesses of the various pastes which are used in the fabrication process. Selection of filter patterns and appropriate materials are within the level of skill in the art.

It will be evident that there are additional embodiments which are not illustrated above but which are clearly within the scope and spirit of the present invention. The above description and drawings are therefore intended to be exemplary only and the scope of the invention is to be limited solely by the appended claims.

I claim:

1. A process for fabricating a stripline filter using pre-fired ceramic technology comprising the steps of:

providing a first pre-fired ceramic substrate having a predetermined coefficient of thermal expansion, a first top surface, a first bottom surface and a first plurality of sides;

printing a first conductive film onto said first top surface;

patterning said first conductive film to define a filter trace pattern;

printing a second conductive film onto said first bottom surface;

painting a third conductive film onto said first plurality of sides of said first substrate;

printing a first seal glass over said first top surface and said filter trace pattern, said first seal glass having a substantially same coefficient of thermal expansion as said predetermined coefficient of thermal expansion;

providing a second pre-fired ceramic substrate having said predetermined coefficient of thermal expansion, a second top surface, *a second plurality of sides*, and a second bottom surface;

lapping said second substrate so that said second top surface and said second bottom surface are uniformly spaced across said substrate;

printing a fourth conductive film onto said second top surface;

printing a second seal glass onto said second bottom surface, said second seal glass having said substantially same coefficient of thermal expansion;

forming an assembly by disposing said second bottom surface abutting said first top surface, aligning said first plurality of sides with said second plurality of [side] *sides*;

firing said assembly to bond said first substrate to said second substrate by bonding said first seal glass to said second seal glass; and painting a fifth conductive film on said first plurality of sides and said second plurality of sides.

2. A process for fabricating a stripline filter as in claim 1 further comprising the step of lapping said first substrate so that said first top surface and said first bottom surface are uniformly spaced across said first substrate.

3. A process for fabricating a stripline filter as in claim 1 further comprising the step of laser machining said first substrate prior to printing said first conductive film.

4. A process for fabricating a stripline filter as in claim 1 further comprising selecting said first conductive paste, said second conductive paste, said third conductive paste and said fourth conductive paste to be the same type of paste.

5. A process for fabricating a stripline filter as in claim 1 further comprising the selecting said first seal glass and said second seal glass to be the same type of seal glass.

6. A process for fabricating a stripline filter as in claim 4 wherein the steps of providing said first substrate and said second substrate including selecting 99.6% alumina.

7. A process for fabricating a stripline filter as in claim 5 wherein the step of selecting said first seal glass and said second seal glass comprise selecting a seal glass with a coefficient of thermal expansion of $7.2\times10^{-6}$.

8. A process for fabricating a stripline filter as in claim 1 wherein the step of patterning said first conductive film comprises:

spinning a photoresist onto said first conductive film;

partially covering said photoresist with a patterned mask;

exposing said photoresist to ultraviolet light;

developing said photoresist to form a photoresist mask over predetermined portions of said first conductive film;

etching portions of said first conductive film which are exposed through said photoresist mask; and removing said photoresist mask.

9. A process for fabricating a stripline filter for use in microwave and millimeter wave applications using a first pre-fired ceramic substrate and a second pre-fired ceramic substrate, each having a first coefficient of thermal expansion, the process comprising the steps of:

[printing] *forming* a first conductive film [onto the] *on a* top surface*, a bottom surface, and at least a portion of a plurality of sides* of said first substrate;

[photolithographically] patterning said first conductive film *on the top surface of said first substrate* to define a filter trace pattern;

[printing a second conductive film onto the bottom surface of said first substrate;

painting a third conductive film onto at least of portion of the sides of said first substrate;]

printing a first seal glass over the top surface of said first substrate and said filter trace pattern, said first seal glass having a substantially same coefficient of thermal expansion as said first coefficient of thermal expansion;

[printing a fourth] *forming a second* conductive film onto [the] *a* top surface of said second substrate;

printing a second seal glass onto [the] *a* bottom surface of said second substrate, said second seal glass having said substantially same coefficient of thermal expansion;

[forming an assembly by] abutting the bottom surface of said second substrate against the top of said first substrate, aligning the *plurality of* sides of said first substrate with [the] *a plurality of* sides of said second substrate;

[firing said assembly to bond said first substrate to said second substrate by] bonding said first seal glass to said second seal glass; and

[painting a fifth] *forming a third* conductive film on at least a portion of the sides of said [assembly] *first and second substrates*.

10. A process for fabricating a stripline filter as in claim 9 further comprising the step of lapping said first substrate so that its top surface and its bottom surface are uniformly spaced across said first substrate.

11. A process for fabricating a stripline filter as in claim 9 further comprising the step of lapping said second substrate so that its top surface and its bottom surface are uniformly spaced across said second substrate.

12. A process for fabricating a stripline filter as in claim 9 further comprising the step of laser machining said first substrate prior to printing said first conductive film to define launch areas.

13. A process for fabricating a stripline filter as in claim 9 further comprising selecting said first conductive paste, said second conductive paste, *and* said third conductive paste [and said fourth conductive paste] to be the same type of paste.

14. A process for fabricating a stripline filter as in claim 9 further comprising the selecting said first seal glass and said second seal glass to be the same type of seal glass.

15. A process for fabricating a stripline filter as in claim 9 wherein said first substrate and said second substrate are 99.6% alumina.

16. A process for fabricating a stripline filter as in claim 15 wherein the step of selecting said first seal glass and said second seal glass comprise selecting a seal glass with a coefficient of thermal expansion of $7.2\times10^{-6}$.

17. A process for fabricating a stripline filter as in claim 9 wherein the step of patterning said first conductive film comprises: spinning a photoresist onto said first conductive film;

partially covering said photoresist with a patterned mask;

exposing said photoresist to ultraviolet light;

developing said photoresist to form a photoresist mask over predetermined portions of said first conductive film;

etching portions of said first conductive film which are exposed through said photoresist mask; and removing said photoresist mask.

*18. A process for fabricating a stripline filter for use in microwave and millimeter wave applications comprising:*

*providing a lower substrate having a first top surface, a first bottom surface and a first plurality of sides, each having a first conductive film formed thereon, having a coefficient of thermal expansion*

*defining filter pattern in the first conductive film on the first top surface;*

*providing an upper substrate having a second top surface with a second conductive film formed thereon, a second bottom surface and a second plurality of sides, having a coefficient of thermal expansion;*

*applying to each of the first top surface and the second bottom surface a material for bonding the upper and lower substrates, the material having a substantially same coefficient of thermal expansion as said coefficient of thermal expansion of the first and second substrates; and*

*forming a third conductive film substantially covering the first and second plurality of sides.*

*19. A process for fabricating a stripline filter as in claim 18 wherein the steps of providing the lower substrate and the upper surface include selecting pre-fired ceramics.*

*20. A process for fabricating a stripline filter as in claim 18 wherein the step of defining a filter trace pattern comprises photolithographically patterning the first conductive material on the top surface of the first substrate.*

*21. A process for fabricating a stripline filter as in claim 18 wherein the step of applying a material includes selecting a material having a second dielectric constant substantially equal to a first dielectric constant of the upper and lower substrates.*

*22. A process for fabricating a stripline filter as in claim 18 further comprising lapping the lower substrate for parallelism between the first top surface and the first bottom surface.*

*23. A process for fabricating a stripline filter as in claim 18 further comprising lapping the upper substrate for parallelism between the second top surface and the second bottom surface.*

*24. A stripline filter for use in microwave and millimeter wave applications comprising:*

*a lower substrate having a first top surface, a first bottom surface and a first plurality of sides, each having a first conductive film formed thereon, the lower substrate being fully fired and having a first coefficient of thermal expansion;*

*a filter pattern formed in the first conductive film on the first top surface;*

*a upper substrate having a second top surface, a second bottom surface and a second plurality of sides, the upper substrate being fully fired and having said first coefficient of thermal expansion;*

*a second conductive film formed on said second top surface;*

*a material for bonding the first top surface of the lower substrate to the second bottom surface of the upper substrate, the material having a second coefficient of thermal expansion substantially the same as the first coefficient of thermal expansion; and*

*a third conductive film formed on the first and second pluralities of sides of the upper and lower substrates respectively.*

*25. A stripline filter as in claim 24 wherein the lower substrate is lapped for parallelism between the first top surface and the first bottom surface.*

*26. A stripline filter as in claim 24 wherein the upper substrate is lapped for parallelism between the second top surface and the second bottom surface.*

*27. A stripline filter as in claim 24 wherein the filter pattern has an interdigitated structure.*

*28. A stripline filter as in claim 24 wherein the material has a second dielectric constant substantially equal to a first dielectric constant of the upper and lower substrates.*

* * * * *